(12) United States Patent
Malis

(10) Patent No.: US 7,670,527 B2
(45) Date of Patent: Mar. 2, 2010

(54) FAILSAFE INJECTED ADHESIVE JOINT

(75) Inventor: Michael B. Malis, Stevenson Ranch, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 843 days.

(21) Appl. No.: 11/430,404

(22) Filed: May 9, 2006

(65) Prior Publication Data

US 2007/0261787 A1 Nov. 15, 2007

(51) Int. Cl.
*B32B 37/12* (2006.01)

(52) U.S. Cl. .......................... 264/261; 264/34; 264/35; 264/263; 264/266; 264/267; 156/293; 156/297; 156/303.1

(58) Field of Classification Search ................ 156/293, 156/297, 303.1; 264/34, 35, 261, 263, 266, 264/267
See application file for complete search history.

(56) References Cited

U.S. PATENT DOCUMENTS

| | | | |
|---|---|---|---|
| 752,669 A | 2/1904 | Guzowski | |
| 1,394,137 A | 10/1921 | Blair | |
| 2,040,126 A * | 5/1936 | Grieve | 144/330 |
| 3,056,187 A * | 10/1962 | Ryan | 29/897.312 |
| 3,098,698 A * | 7/1963 | Glynn | 264/261 |
| 3,498,626 A * | 3/1970 | Sullivan | 280/610 |
| 3,638,978 A | 2/1972 | Guntermann | |
| 3,847,694 A * | 11/1974 | Stewing | 156/86 |
| 3,995,401 A * | 12/1976 | Smith | 52/127.4 |
| 4,044,512 A * | 8/1977 | Fischer et al. | 52/127.4 |
| 4,137,919 A * | 2/1979 | Farin et al. | 606/51 |
| 4,331,723 A * | 5/1982 | Hamm | 428/61 |
| 5,761,870 A * | 6/1998 | Goto | 52/562 |
| 6,036,397 A | 3/2000 | Goto | |
| 6,176,638 B1 | 1/2001 | Kellison et al. | |
| 6,712,099 B2 | 3/2004 | Schmidt et al. | |
| 6,718,713 B2 * | 4/2004 | McKague et al. | 52/309.13 |
| 6,849,150 B1 | 2/2005 | Schmidt | |
| 6,863,767 B2 * | 3/2005 | Bersuch et al. | 156/293 |
| 7,393,488 B2 * | 7/2008 | Grose et al. | 264/254 |

FOREIGN PATENT DOCUMENTS

| | | | |
|---|---|---|---|
| JP | 2001116032 A | * | 4/2001 |
| JP | 2003184849 A | * | 7/2003 |
| KR | 2003088661 A | * | 11/2003 |

\* cited by examiner

*Primary Examiner*—Joseph S. Del Sole
*Assistant Examiner*—Timothy Kennedy
(74) *Attorney, Agent, or Firm*—Bracewell & Giuliani LLP

(57) ABSTRACT

A composite member is joined to another composite or non-composite member, using liquid or paste adhesive resin that cures in the joint. The joint is configured in such a way that the adhesive forms an interlocking key within recesses in the joined members that prevents joint disassembly once the adhesive has cured and hardened. Both of the members are provided with recesses extending along their lengths in the joint. The recesses register with each other to define a cavity and may undulate. The recessed are designed in such a way as to take the full load capability if the joint, even if there is no adhesion to the joined members. Adhesive is injected into the cavity through injection ports spaced periodically along the length of the joint.

14 Claims, 3 Drawing Sheets

FAILSAFE INJECTED ADHESIVE JOINT

FIELD OF THE INVENTION

This invention relates in general to a method for joining structural composite parts or composite to noncomposite parts using an adhesive injected into the joint with failsafe features

BACKGROUND OF THE INVENTION

One method of joining two structural members together is by the use of an adhesive at the interface between the two members. The adhesive typically transfers shear load between the members via an adhesive bond. This bond is critical, and requires considerable effort in both manufacturing and inspection. Despite the best efforts, use of adhesive bonds in aircraft and other primary structures is very difficult to certify, due to the catastrophic failure mode of a debonded joint. The only proven way around this pervasive problem is to bolt the bonded joint together with mechanical fasteners, which removes many advantages of the bonded joint, particularly when the joined members are composite.

It is important during the bond assembly process that the adhesive extend throughout the bonding surface, preferably at a uniform thickness. This is difficult to accomplish at times, leaving spaces or areas that do not have adhesive. Speeding the process up would be desirable to reduce costs.

SUMMARY OF THE INVENTION

In this invention, elongated, undulating recesses are formed in the bonding surfaces between two members to be joined. The recesses align with each other to define an elongated cavity when the bonding surfaces are placed against each other. Adhesive is injected into the cavity formed by the recesses. When cured, the adhesive both bonds the members together, and forms interlocking resin keys that carry load in case of bondline failure.

Preferably, one of the members is a composite skin panel with a molded holes and recesses while the other member is either composite with a similar molded recess or a metallic member with a machined recess. The recesses are preferably shallow grooves that are rectangular in cross section, and undulate both in direction and width, forming a sinusoidal or diamondback pattern. This geometry provides locking of the keys in all directions, as well as a generous flow path and ample cross sectional areas to allow high shear loads in the adhesive keys. Preferably the recesses extend from one end of the assembly joint to the other end. Preferably, the injection ports occur at the wide areas of the grooves, to permit easy flow at the entry and exit ports for the adhesive.

As the adhesive flows through the grooves, it will completely fill the channel until it exits the next injection port, at which time the injection is continued from that same port. This operation is completed when the bond line is filled, at which time the ports can be plugged to prevent adhesive loss.

In one embodiment, the structural members comprise flat surfaces that are joined orthogonally to each other. These members may be analogous to a wing or fuselage skin with an underlying spar or frame substructure. One member contains a clevis shaped feature, while the other member is of a blade configuration. There are bonding areas on both sides of the blade, and the grooves are repeated on both sides. The injection port accesses the joint from below the clevis, and engages the grooves in both the clevis and blade feature of both members.

Prewoven composite reinforcements (preforms) can be used to form the clevis features easily, and can be cured along with the skin portion of the outer member. The blade member can be a simple flat laminate portion of the underlying substructure. Both members can use a simple mandrel tooling to form the recess in each side of the joint during part layup/infusion and cure Another possible joint in which this invention can be employed is a lap shear configuration. This is a very common type of joint that is used in joining two like members such as in a skin to skin, frame to frame, or even truss attachments. In this case, there is one bond line formed when two members are lapped over each other. There is only one groove in each member, and they are created, aligned, and injected in a similar manner as the clevis configuration mentioned above.

This invention completely solves the prior art bonding problems by providing an alternate means of load transfer in case of bond failure, thereby enabling a failsafe feature in the joint that does not require mechanical fasteners. It is compatible with composite laminates and even metal parts, provided the recesses can be economically fabricated. Typically, recesses and holes can be molded in during the cure process of resin matrix composite, particularly in the case of processes that infuse dry fabric or preforms.

Injecting adhesive from outside the structure into a structural bonded joint is a vast improvement of current techniques. Fitup and surface preparations of the bonding surfaces are no longer critical. The only critical processes that must be verified is that the adhesive has properly filled out all the recesses and is fully cured. This verification is easy to do, since the adhesive samples can be taken from the exposed injection ports, and filling of the cavities can be verified by X-ray or techniques commonly used for structures.

Also, the invention allows dry assembly with sequential bonding of individual joints. This feature allows large structures to be joined over a period of time, without regard for the cure time of the adhesive.

DETAILED DESCRIPTION OF THE INVENTION

Figure 1:
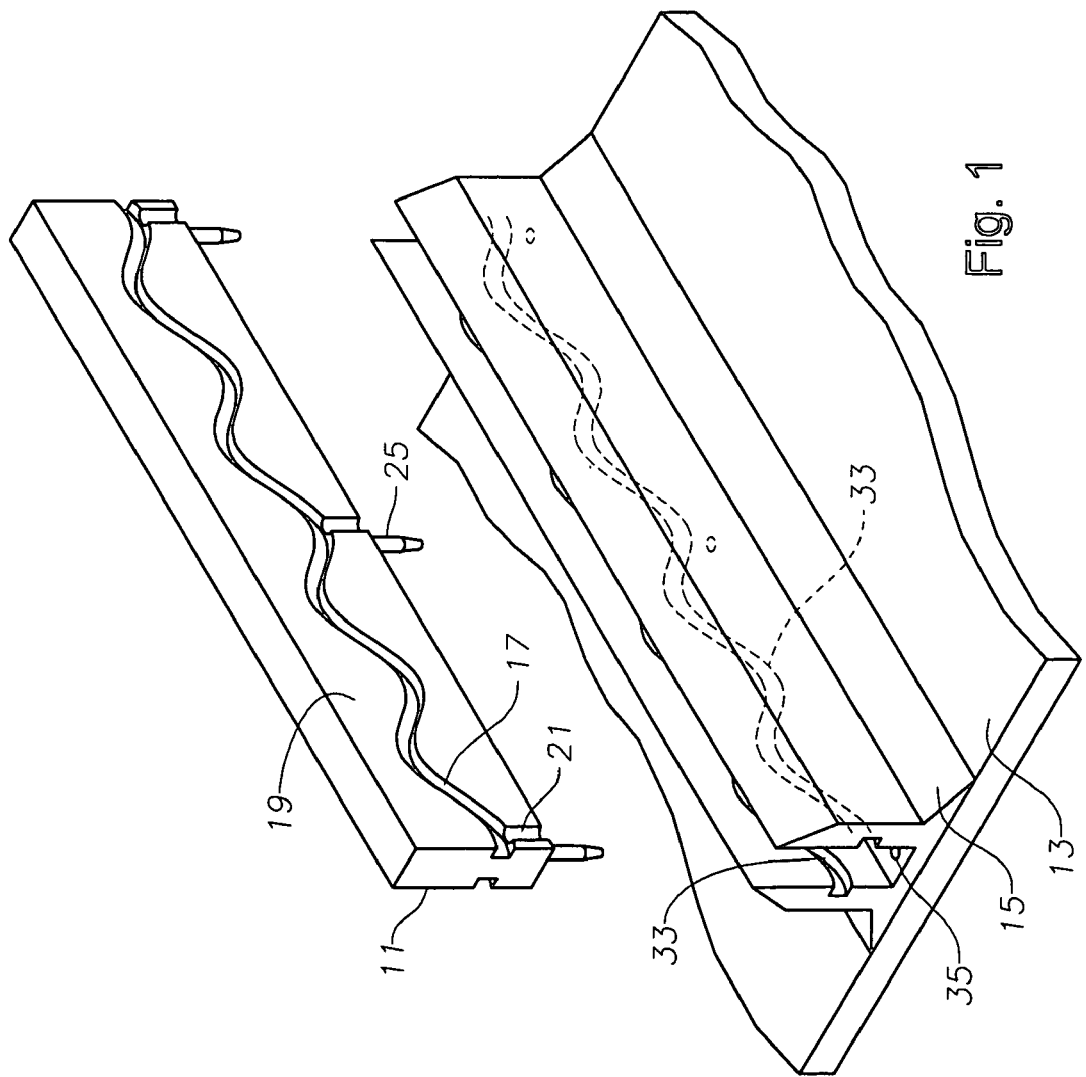
FIG. 1 is an exploded perspective view showing an example of a structural member, a preform, and an aircraft skin assembly in accordance with this invention.

Referring to FIG. 1, a structural member 11 is shown being joined to a second member 13, which typically comprises the skin of an aircraft. In one example, an interface member 15 provides an interface to bond structural member 11 with skin 13. In one embodiment, interface member 15 comprises a woven preform, however other members could alternately be used.

Structural member 11 may comprise a variety of aircraft frame components such as a spar or beam of a wing or fuselage, a bulkhead, or a bracket. The word "structural" is used for convenience and not in a limiting manner. In this embodiment, both structural member 11 and skin 13 are formed of laminated resin composite material. That is, each is formed of multiple layers of fiber, such as carbon, laid up one upon the other. Some of the layers may be unidirectional and other layers woven or otherwise configured. Alternatively, structural member 11 could be a metal. Preferably, structural member 11 and skin 13 are cured prior to assembly.

Figure 2:
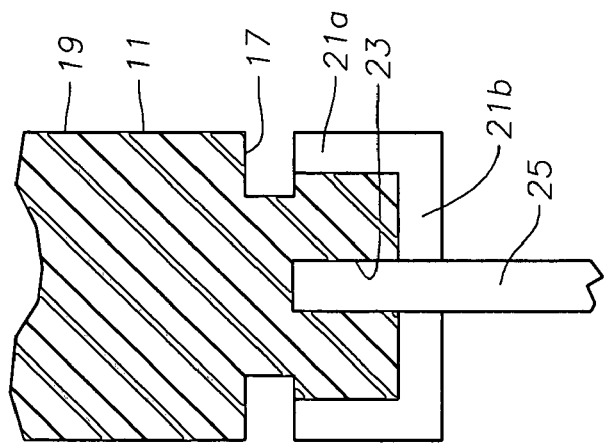
FIG. 2 is a transverse sectional view of the structural member of FIG. 1.
Figure 4:
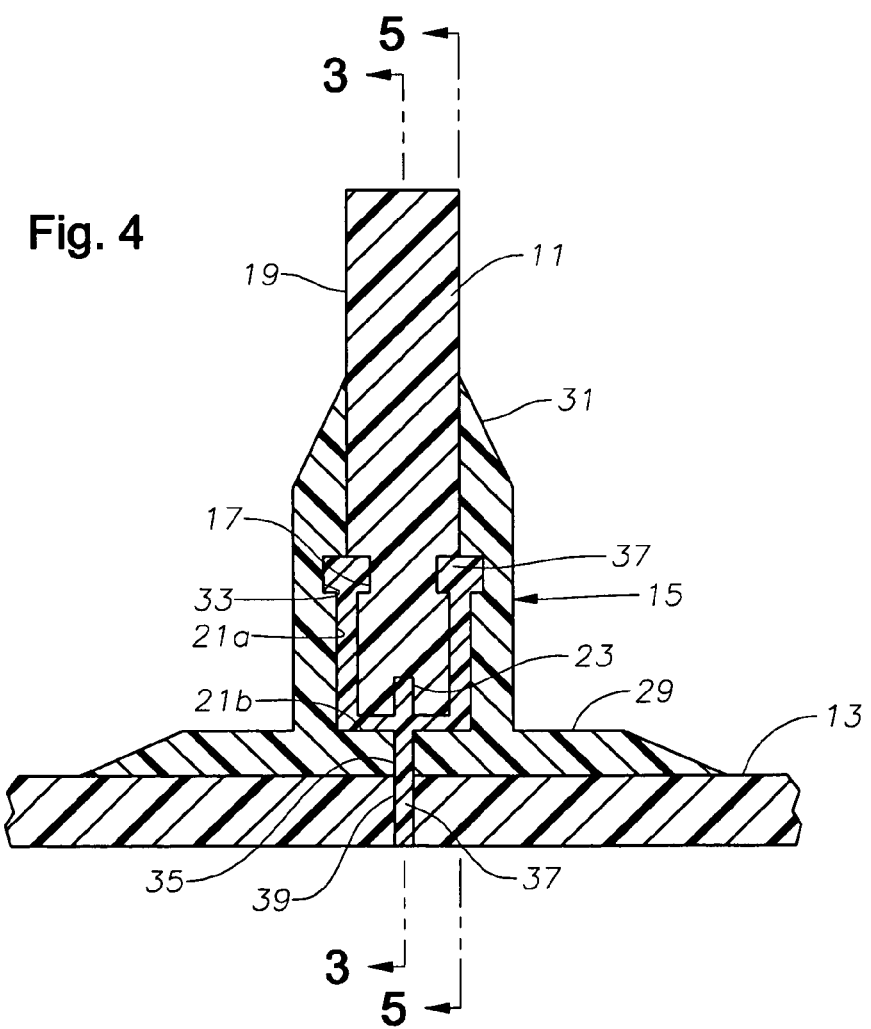
FIG. 4 is a transverse sectional view of the assembly of FIG. 1, after or during the injection of adhesive.

Structural member 11 has two flat sides 19 that face opposite directions. Each side 19 has a recess or groove 17 formed therein. As shown in FIGS. 2 and 4, groove 17 is preferably rectangular in transverse section, but other shapes are feasible. Also, in this example, groove 17 undulates in a longitudinal or axial direction, having peaks and valleys, defining a general sine wave configuration. This undulating groove can also be varied to create other shapes with an increase in recess area, for instance, two sine wave shapes can be placed back to back, resulting in a diamondback pattern. Grooves 17 extend along the length of structural member 11.

Figure 3:
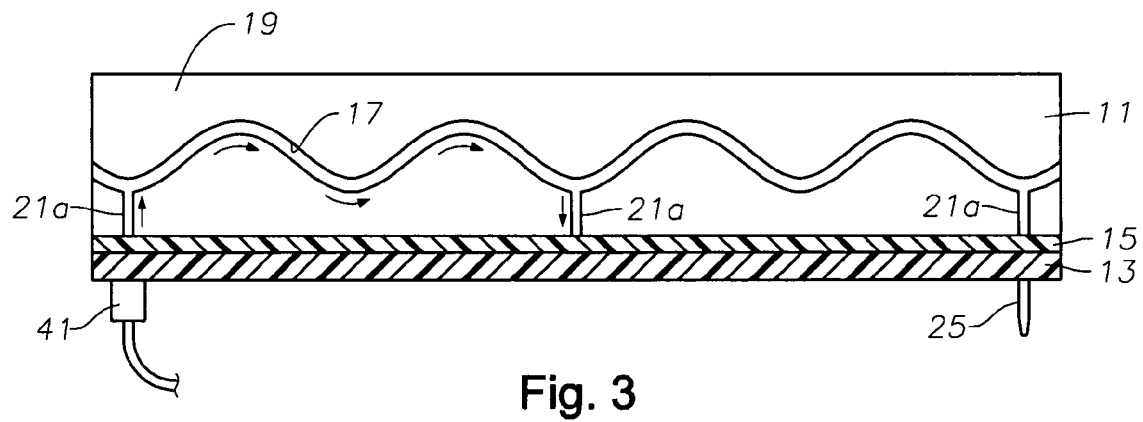
FIG. 3 is sectional view of the assembly of FIG. 1, taken along the line 3-3 of FIG. 4, and showing adhesive being injected.

A plurality of communication channels 21 are formed in structural member 11. As shown in FIGS. 3 and 4, each communication channel 21 has a side section 21a that is formed in each side 19 and intersects one of the grooves 17. Side section 21a extends to the base edge of structural member 11. Communication channel 21 has a base section 21b that extends along the base edge of structural member 11 and joins the two side sections 21a. Communication channels 21 are spaced apart from each other at selected points along the length of structural member 11.

As shown in FIGS. 2 and 4, a hole 23 is formed in structural member 11 approximately midway between sides 19 and extends upward from the base edge of structural member 11 a selected distance. Each hole 23 intersects base section 21b of one of the communication channels 21. As shown in FIGS. 1-3, a temporary locator pin 25 is inserted into each hole 23 prior to assembly. Grooves 17, communication channels 21, and holes 23 are preferably formed in structural member 11 during its molding process.

Figure 6:
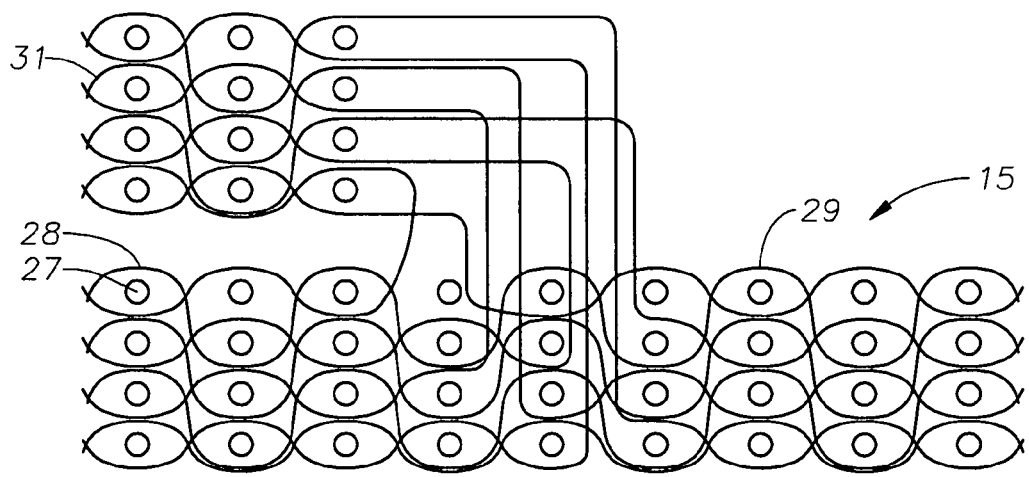
FIG. 6 is a schematic view of a weave pattern of the woven preform of FIG. 1.

In this embodiment, preform 15 is a composite fiber member that is woven. FIG. 6 illustrates one example of a suitable weave pattern for preform 15, showing one-half of preform 15. Parallel warp fibers 27 are looped or woven together with fill fibers 28. In this example, preform 15 is "pi-shaped", having a flat base 29 and two parallel legs 31 (FIGS. 1, 4) that are perpendicular to base 29, defining a clevis. FIG. 6 shows one-half of base 29 and one leg 31, which is shown folded over base 29 during the weaving process. Base 29 and legs 31 are woven at the same time and interlinked with fill fibers 28. There are four layers in base 29 and leg 31 in this embodiment, and each of the layers is interlinked with the others by means of the fill fibers 28. After weaving, legs 31 are straightened to an orthogonal orientation, and perform 15 is pre-impregnated with a resin.

Figure 5:
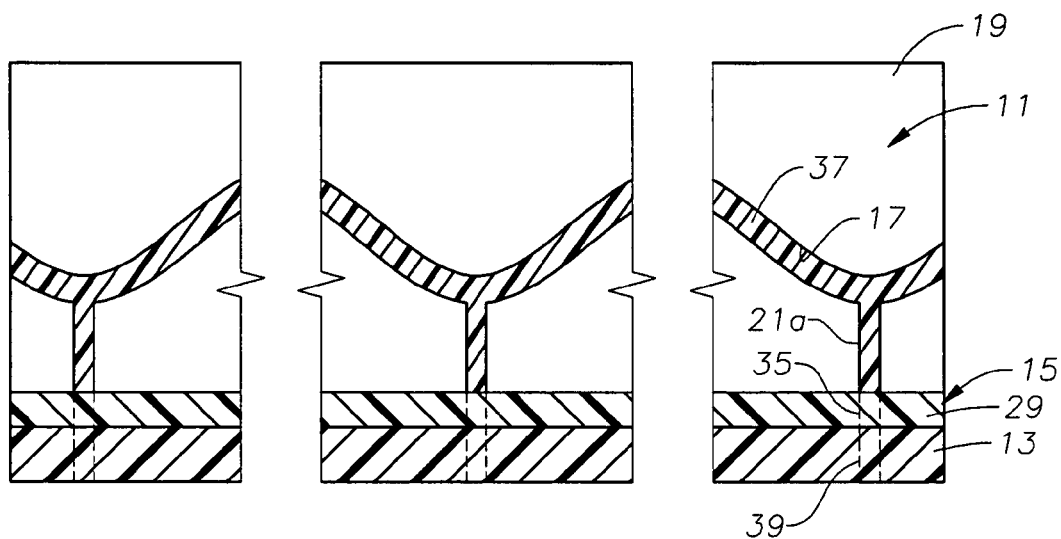
FIG. 5 is a sectional view of the assembly of FIG. 1, taken along the line 5-5 of FIG. 4.

Referring again to FIG. 1, base 29 of preform 15 has one side that abuts skin 13. The inside surface of each leg 31 has a recess or groove 33 for mating with groove 17. Grooves 33 and 17 have the same configuration and undulate in the same manner. When aligned, grooves 17 and 33 define a cavity that is elongated and extends from one end to the other end of the assembly. Holes 35 (FIGS. 4, 5) are formed in base 29 at the same distance apart as holes 23 in structural member 11. During assembly holes 23 will align with holes 35. Preferably, holes 35 and grooves 33 are formed in a molding process prior to assembly with a multi-piece die that inserts between legs 31. Holes 39 (FIGS. 4, 5) are formed in skin 13 at the same distance apart from each other as holes 23 and 35. Holes 39 align with holes 23 and 35 during assembly.

Referring to FIG. 1, during assembly, locator pins 25 are pressed into holes 23 (FIGS. 2, 4). Preform 15 is placed on skin 13 with holes 35, 39 (FIGS. 4, 5) in alignment, and cured or bonded together. Structural member 11 is inserted between legs 31 and locator pins 25 are stabbed through holes 35, 39. The technician will clamp structural member 11 to skin 13 with a jig or fixture.

Then the technician removes the first two locator pins 25 and connects a hose adapter 41 to the first one of the skin holes 39, as illustrated in FIG. 3. The technician pumps adhesive 37 (FIGS. 4 and 5) through holes 35, 39 and communication channel sections 21a, 21b into the cavity defined by grooves 17, 33. Adhesive 37 flows along grooves 17, 33 to the second set of holes 35, 39 and communication channels 21.

Once adhesive 37 begins to flow out the second hole 39, the operator ceases pumping adhesive 37, removes adapter 41 and plugs the first hole 39. Subsequently, the technician removes the third and fourth locator pins 25 and repeats the process of pumping adhesive 37. Adhesive 37 flows through communication channel sections 21a, 21b to grooves 17, 33 and flows between the third and fourth locator pins 25. Some of the adhesive 37 may flow the opposite direction to the second hole 39. The operator repeats the process until grooves 17, 33 are substantially filled with adhesive 37.

The operator then cures the bond in a conventional manner, typically by heat. Vacuum bagging may be employed if desired. Optionally, an adhesive film may be located between base 29 and skin 13. Although believed not needed, paste adhesive could also be placed between preform legs 31 prior to insertion of structural member 11, if desired.

The invention has significant advantages. The elongated groove between the bonding surfaces provides an adhesive rib that interlocks the pieces together, increasing the shear strength of the joint. The undulations increase shear strength both in directions perpendicular to the lengths as well as along the lengths. The method allows the members to be set up in a fixture while in a dry condition, which speeds up the process.

While the invention has been shown in only one of its forms, it should be apparent to those skilled in the art that it is not so limited but it is susceptible to various changes without departing from the scope of the invention. For example, although shown to be a pi-shaped preform, a preform with different configurations, such as a T, X or L shape, could be employed in different applications. In some instances, the preform could be eliminated, with the grooves being formed in two structural members to define a cavity. If the grooves were short enough, only two communication channels may be needed. Further, the communication channels could be formed in the woven perform instead on in the structural member.

I claim:

1. A method of joining a structural member to an aircraft skin, comprising:
   (a) providing the structural member with a bonding surface having a first end and a second end and a groove that extends along the bonding surface of the structural member from the first end to the second end;
   (b) providing an interface member with a base and a leg, the leg having a bonding surface with a first end and a second end and a groove that extends along the bonding surface of the leg from the first end to the second end of the leg;
   (c) placing the bonding surfaces of the structural member and the leg in contact with each other so that the grooves mate to define a cavity extending from the first ends to the second ends of the bonding surfaces;
   (d) injecting adhesive into the cavity; and
   (e) bonding the base of the interface member to the skin.

2. The method according to claim 1, wherein the structural member comprises a resin composite laminate, and wherein the method further comprises curing the resin in the structural member prior to steps (c), (d) and (e).

3. The method according to claim 1, wherein the interface member comprises a woven preform, and step (b) comprises pre-impregnating the preform with a resin and curing the preform during step (e).

4. The method according to claim 1, further comprising:
providing first and second communication channels that extend from the cavity at spaced apart distances between the first and second ends of the bonding surfaces; and wherein step (d) comprises:
injecting the adhesive into the first communication channel until the adhesive begins to flow from the second communication channel.

5. The method according to claim 1, further comprising:
providing first and second communication channels that extend from the cavity at spaced apart distances between the first and second ends of the bonding surfaces;
providing first and second locator pin holes through the skin, though the base of the interface member, and into the structural member, the first and second locator pin holes registering with the first and second communication channels, respectively;
inserting locator pins into the locator holes in the structural member; and wherein step (c) comprises:
inserting the locator pins into the locator holes; and step (d) comprises:
removing the locator pins, injecting the adhesive into the first locator hole and the first communication channel until the adhesive begins to flow from the second locator hole of the skin.

6. The method according to claim 1, wherein the grooves have undulations that define a sinuous path between the first and the second ends of the bonding surfaces of the structural member and the interface member.

7. The method according to claim 1, wherein the interface member comprises a woven preform; and the perform is cured prior to step (c).

8. A method of joining a structural member to an aircraft skin, comprising:
(a) providing the structural member with opposite sides that are parallel to each other and face in opposite directions from each other, and providing a pair of grooves, the grooves being on the opposite sides of the structural member and extending lengthwise along the structural member;
(b) providing an interface member having a base and a pair of legs extending orthogonally therefrom, each of the legs having an inside surface, the inside surfaces being parallel to and facing each other, and providing a groove on each of the inside surfaces extending lengthwise along the interface member;
(c) inserting the structural member between the legs such that the opposite sides of the structural member are in contact with the inside surfaces of the interface member, the grooves of the structural member aligning with the grooves of the legs to define elongated cavities;
(d) injecting adhesive into each of the cavities; and
(e) curing the adhesive and bonding the interface member to the skin.

9. The method according to claim 8, wherein the interface member is a woven preform containing a resin, and wherein the resin is also cured prior to step (c).

10. The method according to claim 8, wherein steps (a) and (b) comprises providing the grooves with undulations that define a sinuous path from one end of the interface member to another end of the interface member.

11. The method according to claim 8, wherein the structural member and the skin comprise resin composite laminates and steps (a) and (b) comprise curing resin in the structural member and the skin before step (c).

12. The method according to claim 8, wherein steps (a) and (b) comprise:
providing first and second communication channels that extend from the cavity at lengthwise spaced apart distances; and wherein step (d) comprises:
injecting the adhesive into the first communication channel until the adhesive begins to flow from the second communication channel.

13. The method according to claim 8, wherein steps (a) and (b) comprise:
providing the structural member with first and second communication channels spaced apart lengthwise along the structural member, each communication channel having a side section that extends from one of the grooves on the structural member and a base section on an edge of the structural member that joins the side sections to each other; and wherein step (d) comprises:
injecting the adhesive into the first communication channel until the adhesive begins to flow from the second communication channel.

14. The method according to claim 8, further comprising:
providing first and second communication channels that extend from the cavity at lengthwise spaced apart distances;
providing first and second locator holes through the skin, through the base of the interface member between the legs, and into the structural member, the first and second locator holes registering with the first and second communication channels, respectively;
inserting locator pins into the locator holes in the structural member; and wherein step (c) comprises:
stabbing the locator pins into the locator holes in the interface member and the skin; and step (d) comprises:
removing the locator pins and injecting the adhesive into the first locator holes in the skin, which flows through the first locator hole in the perform, the first communication channel and the cavities to the second locator holes; and
stopping the injection of adhesive into the first locator holes when the adhesive begins to flow from the second locator hole of the skin.

\* \* \* \* \*